US008635990B2

(12) United States Patent
Shafer et al.

(10) Patent No.: US 8,635,990 B2
(45) Date of Patent: Jan. 28, 2014

(54) AVOIDANCE OF SPARK DAMAGE ON VALVE MEMBERS

(75) Inventors: Scott F. Shafer, Morton, IL (US); Jeremy T. Claus, Chillicothe, IL (US); Daniel R. Ibrahim, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 396 days.

(21) Appl. No.: 13/168,281

(22) Filed: Jun. 24, 2011

(65) Prior Publication Data

US 2011/0248103 A1 Oct. 13, 2011

Related U.S. Application Data

(62) Division of application No. 11/647,387, filed on Dec. 29, 2006, now Pat. No. 8,002,206.

(51) Int. Cl.
*F16K 31/02* (2006.01)

(52) U.S. Cl.
USPC ..... 123/472; 174/51; 239/585.1; 251/129.02; 251/129.16

(58) Field of Classification Search
USPC ............. 251/129.02, 129.15, 129.16; 174/51; 239/585.1; 123/472
See application file for complete search history.

(56) References Cited

U.S. PATENT DOCUMENTS

| | | | |
|---|---|---|---|
| 3,698,684 | A | 10/1972 | Grenier |
| 4,111,178 | A | 9/1978 | Casey |
| 4,341,196 | A | 7/1982 | Canup et al. |
| 4,341,241 | A | 7/1982 | Baker |
| 4,390,130 | A | 6/1983 | Linssen et al. |
| 4,508,174 | A | 4/1985 | Skinner et al. |
| 4,566,482 | A | 1/1986 | Stunkard |
| 4,877,187 | A | 10/1989 | Daly |
| 4,893,781 | A | 1/1990 | Kalain et al. |
| 4,909,447 | A | 3/1990 | Gallup et al. |
| 5,190,071 | A | 3/1993 | Sule |
| 5,238,224 | A | 8/1993 | Horsting |
| 5,558,311 | A | 9/1996 | Connolly et al. |
| 5,595,215 | A | 1/1997 | Wallace et al. |
| 5,603,355 | A | 2/1997 | Miyazoe et al. |
| 5,707,039 | A | 1/1998 | Hamilton et al. |
| 5,715,788 | A | 2/1998 | Tarr et al. |
| 5,983,855 | A | 11/1999 | Benedikt et al. |
| 6,390,385 | B1 | 5/2002 | Hardy et al. |
| 6,598,852 | B2 | 7/2003 | Tomoda et al. |
| 6,712,035 | B2 | 3/2004 | Gottemoller et al. |
| 6,737,766 | B1 | 5/2004 | Burrola et al. |
| 6,748,977 | B2 | 6/2004 | Berto |
| 6,793,196 | B2 | 9/2004 | VanWeelden et al. |
| 6,837,478 | B1 | 1/2005 | Goossens et al. |

(Continued)

FOREIGN PATENT DOCUMENTS

| | | |
|---|---|---|
| DE | 19638025 | 3/1998 |
| DE | 1707797 | 9/2002 |

(Continued)

*Primary Examiner* — John Bastianelli
(74) *Attorney, Agent, or Firm* — Finnegan, Henderson, Farabow, Garrett & Dunner LLP

(57) ABSTRACT

A solenoid operated valve assembly is provided. The valve assembly may include a solenoid having a solenoid coil and an armature movable under influence of the solenoid coil. The valve assembly may also include a valve member operably connected to the armature and configured to selectively contact a valve seat. The valve assembly may further include an outer body containing the solenoid, the armature, the valve member, and the valve seat. In addition, the valve assembly may include a grounding device including an electrically conductive element disposed between the valve member and the outer body.

9 Claims, 7 Drawing Sheets

(56) References Cited

U.S. PATENT DOCUMENTS

| | | | |
|---|---|---|---|
| 6,851,622 | B2 | 2/2005 | Demere et al. |
| 6,874,475 | B2 | 4/2005 | Katsura et al. |
| 6,923,429 | B2 | 8/2005 | Merrill et al. |
| 7,004,450 | B2 | 2/2006 | Yoshimura et al. |
| 7,243,637 | B2 | 7/2007 | Kaneko et al. |
| 7,497,203 | B2 | 3/2009 | Ibrahim et al. |
| 2002/0145125 | A1 | 10/2002 | Tomoda et al. |
| 2007/0028869 | A1 | 2/2007 | Ibrahim et al. |

FOREIGN PATENT DOCUMENTS

| | | |
|---|---|---|
| DE | 10131125 | 12/2002 |
| EP | 0661446 | 7/1995 |
| EP | 1150001 | 10/2001 |
| WO | 2005002292 | 1/2005 |

AVOIDANCE OF SPARK DAMAGE ON VALVE MEMBERS

RELATED U.S. APPLICATION DATA

This application is a divisional of U.S. application Ser. No. 11/647,387 filed Dec. 19, 2006, now pending, which is hereby fully incorporated by reference.

TECHNICAL FIELD

The present disclosure relates to an apparatus and a method for avoidance of spark damage on valve members and, more particularly, to an apparatus and a method for avoiding spark damage to valve members in a solenoid operated valve assembly.

BACKGROUND

Engines sometimes use fuel injection systems to introduce fuel into the combustion chambers of the engine. Fuel injection systems may include a number of fuel injectors, which may include solenoid operated valve assemblies for controlling the flow of fuel. A solenoid operated valve assembly may include a solenoid and an associated valve. The solenoid may include an armature, a biasing spring, and a solenoid coil, which acts as a magnet when provided with current.

When the solenoid coil is provided with current, a toroidal field of magnetic flux develops rapidly. The flux transfers to the stator core, in order to actuate the valve. Ideally the flux would remain confined to the stator core material. However, the magnetic flux may transfer to other components, such as, for example, the biasing spring, valve body, valve housing, etc. Relative movement between the electrically conductive biasing spring and the magnetic field may result in an induced voltage in the biasing spring. The induced voltage may result in current flow through valve members of the solenoid controlled valve assembly. Relative movement of cooperating valve members may then cause spark discharge or arcing, which may result in pitting of one or more of the valve members.

Systems have been developed for controlling electrical current in solenoid operated valves. For example, U.S. Pat. No. 6,598,852 (the '852 patent) issued to Tomoda, et al., discloses a solenoid valve assembly including a spring configured to complete a circuit through various stationary components of the valve assembly, for grounding a solenoid coil. While the system of the '852 patent may include means for grounding the solenoid coil, the system does not include structure for grounding elements in connection with a return spring (a.k.a. a biasing spring). Therefore, magnetic flux that transfers to the return spring could still cause arcing between a valve element and valve seats.

The present disclosure is directed to overcoming one or more of the problems discussed above.

SUMMARY OF THE INVENTION

In one aspect, the present disclosure is directed to a solenoid operated valve assembly. The valve assembly may include a solenoid having a solenoid coil and an armature movable under influence of the solenoid coil. The valve assembly may also include a valve member operably connected to the armature and configured to selectively contact a valve seat. The valve assembly may further include an outer body containing the solenoid, the armature, the valve member, and the valve seat. In addition, the valve assembly may include a grounding device including an electrically conductive element disposed between the valve member and the outer body.

In another aspect, the present disclosure is directed to a fluid injector configured to regulate the flow of fluid. The fluid injector may include a solenoid operated valve assembly. The valve assembly may include a solenoid having a solenoid coil and an armature movable under influence of the solenoid coil. The valve assembly may also include a valve member operably connected to the armature and configured to selectively contact a valve seat. The valve assembly may further include an outer body containing the solenoid, the armature, the valve member, and the valve seat. In addition, the valve assembly may include a grounding device including an electrically conductive element disposed between the valve member and the outer body.

In another aspect, the present disclosure is directed to A solenoid operated device. The device may include a solenoid having a solenoid coil and an armature movable under influence of the solenoid coil. The device may also include a first member operably connected to, and movable with, the armature, and configured to selectively contact a second member. The device may further include an outer body containing the solenoid, the armature, the first member, and the second member; and a grounding device including an electrically conductive element disposed between the first member and the outer body.

DETAILED DESCRIPTION

Reference will now be made in detail to the drawings. Wherever possible, the same reference numbers will be used throughout the drawings to refer to the same or like parts.

Figure 1:
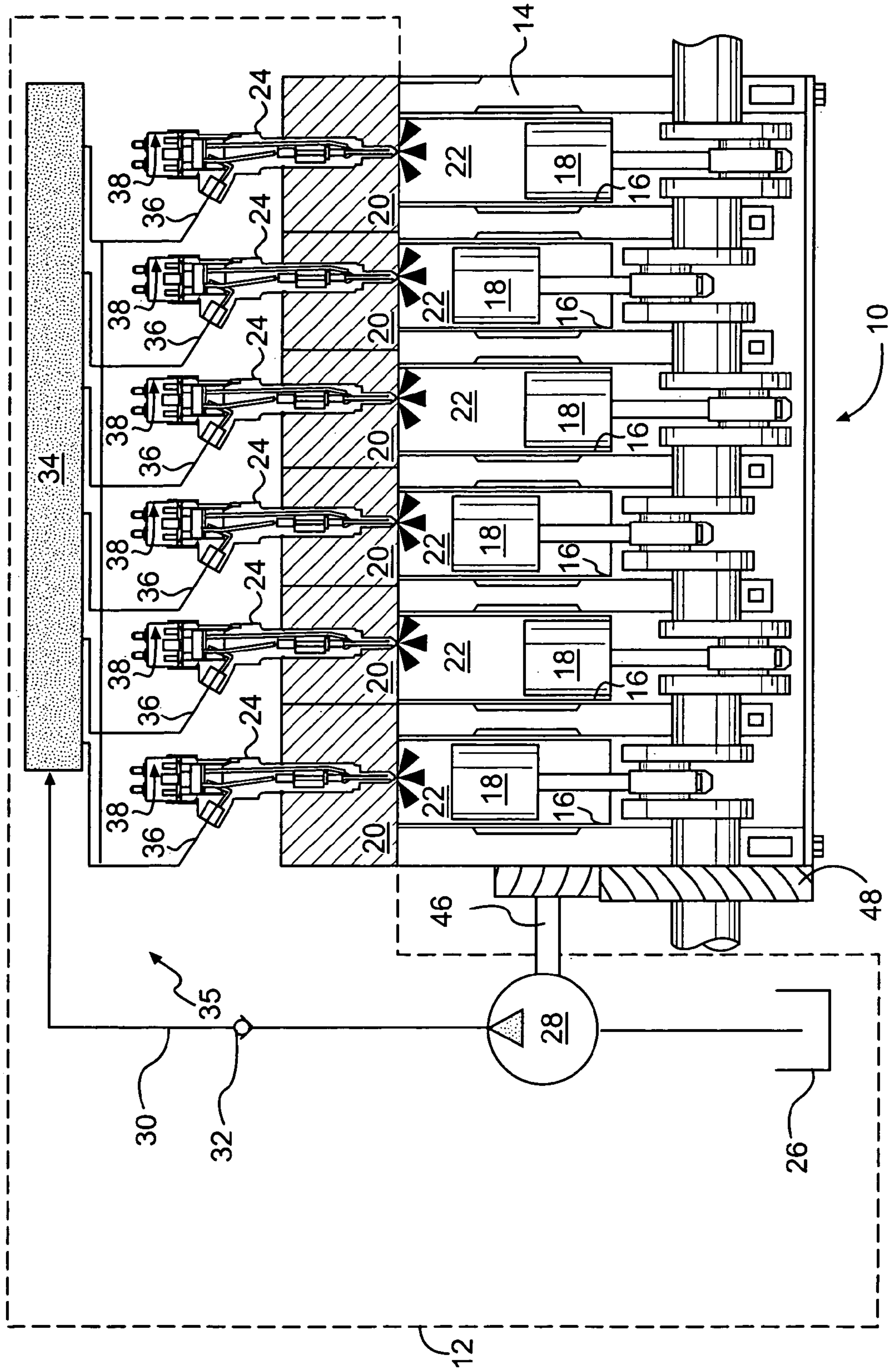
FIG. 1 is a schematic and diagrammatic illustration of an exemplary disclosed fuel injection system for an engine.

FIG. 1 diagrammatically illustrates an engine 10 with a fuel injection system 12. Engine 10 may include an engine block 14 that defines a plurality of cylinders 16, a piston 18 slidably disposed within each cylinder 16, and a cylinder head 20 associated with each cylinder 16. Each cylinder 16, piston 18, and cylinder head 20 may form a combustion chamber 22.

Fuel injection system 12 may include components that cooperate to deliver fuel to fuel injectors 24, which may deliver fuel into each combustion chamber 22. For example, fuel injection system 12 may include a supply tank 26, a fuel pump 28, a fuel line 30 including a check valve 32, and a manifold 34. From manifold 34, fuel may be supplied to each fuel injector 24 through a fuel line 36. Each fuel injector 24 may include at least one solenoid operated valve assembly 38.

It should be noted that although valve assembly 38 is shown and discussed with respect to applications in fuel injectors, valve assembly 38 may be applicable to any type of fluid injector.

Figure 2:
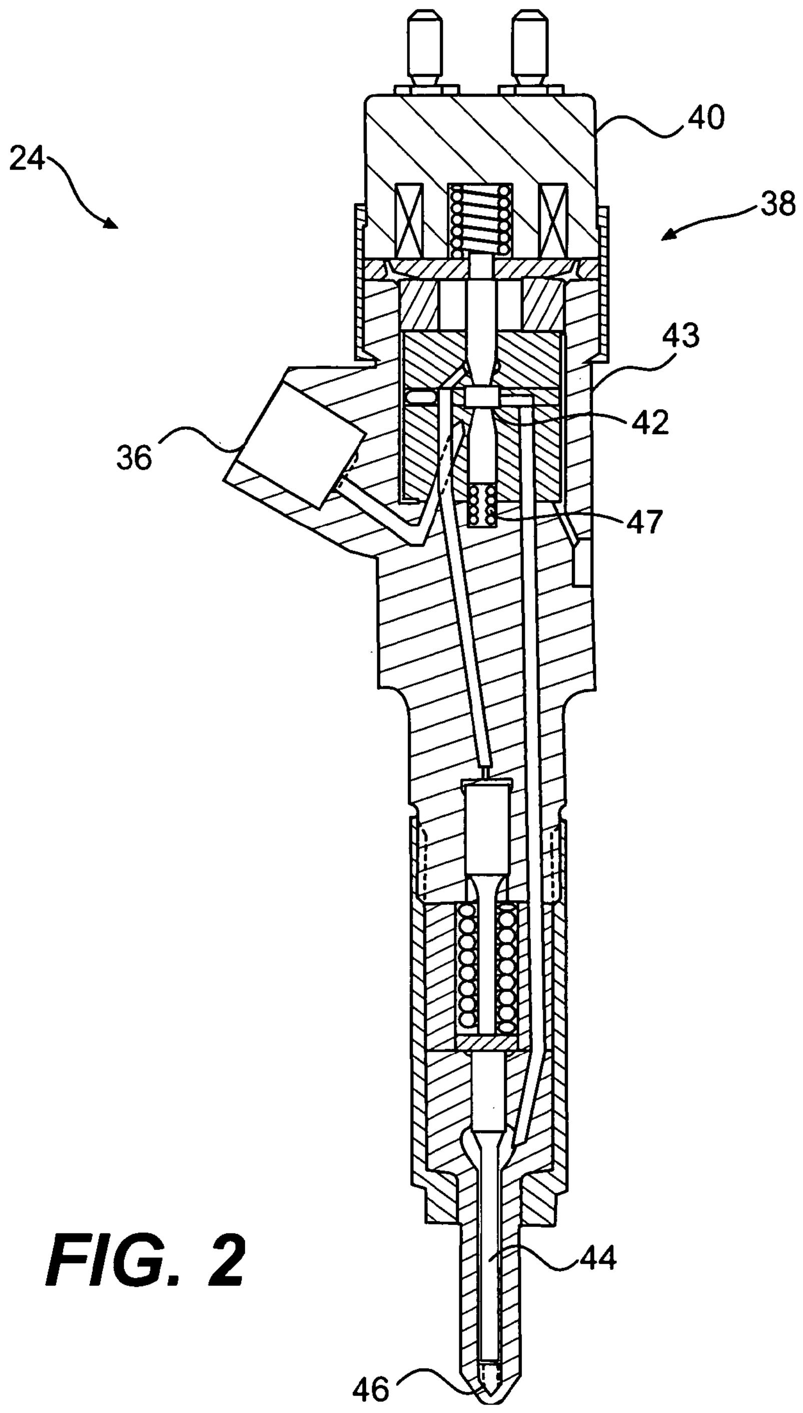
FIG. 2 is a cutaway view illustrating an exemplary disclosed fuel injector for the fuel injection system of FIG. 1.

FIG. 2 is a cutaway view of an exemplary fuel injector 24. As shown in FIG. 2, solenoid operated valve assembly 38 may include a solenoid 40. Solenoid 40 may control a valve 42 located in an outer body 43. Valve 42 may control the flow of fuel to an injector valve needle 44. Injector valve needle 44 may cooperate with an orifice 46 to inject fuel into combustion chamber 22 (See FIG. 1). In one embodiment, fuel injector 24 may also include a grounding spring 47, which will be discussed in greater detail below with respect to FIGS. 3 and 4.

Figure 3:
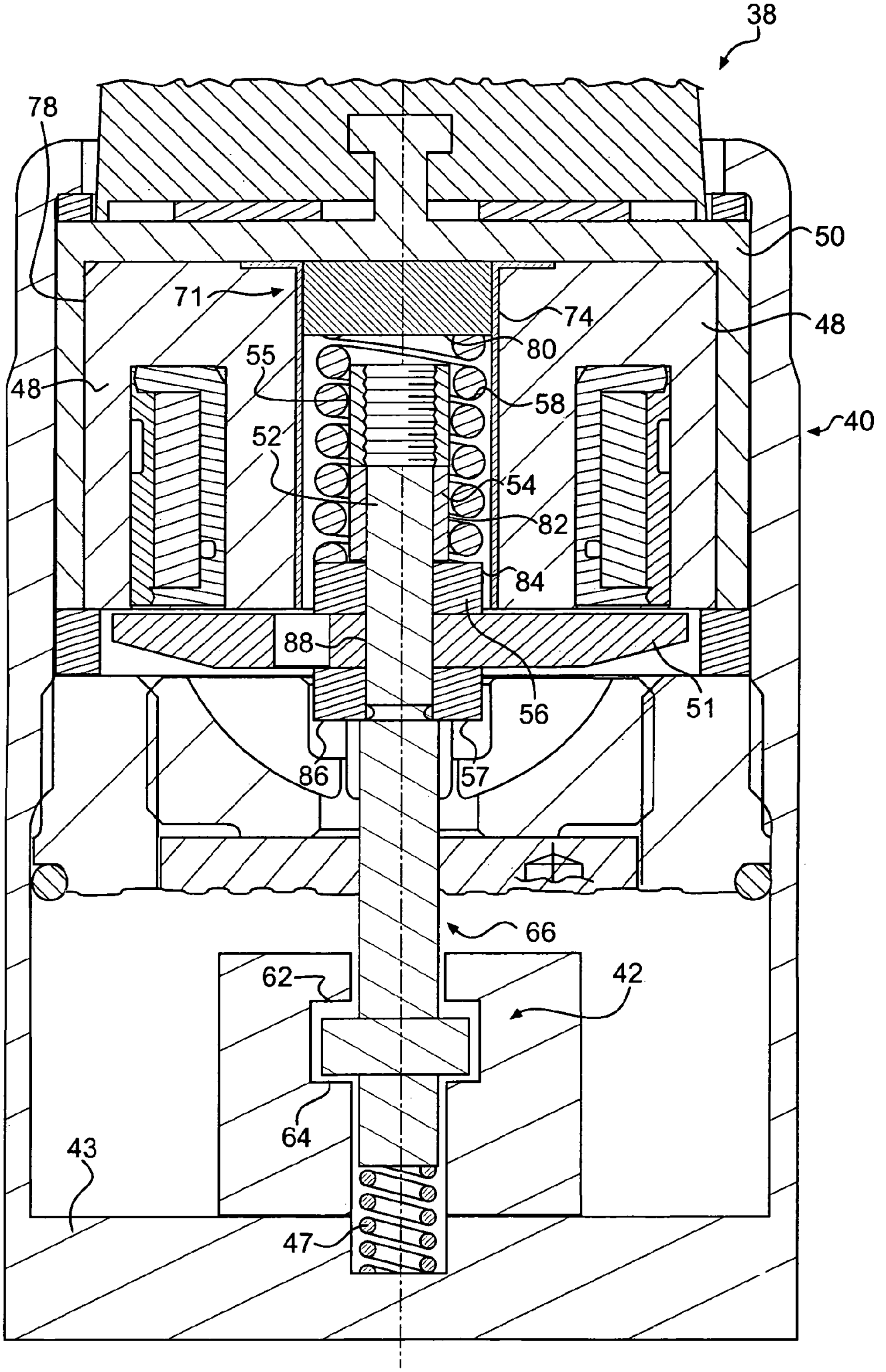
FIG. 3 is a diagrammatic illustration of a solenoid operated valve assembly according to an exemplary disclosed embodiment.

FIG. 3 is a simplified, diagrammatic illustration of certain components of solenoid operated valve assembly 38. Solenoid 40 may include a solenoid coil 48, which may be at least partially enclosed by a housing 50. Solenoid 40 may also include an armature 51, which may be composed of a magnetically attractive material, such as, for example, a ferromagnetic material.

When current is supplied to solenoid coil 48, a magnetic field forms and solenoid coil 48 becomes a magnet. Because armature 51 may be composed of a magnetically attractive material, armature 51 may be moved under the influence of solenoid coil 48. In the exemplary embodiment illustrated in FIG. 3, armature 51 may be caused to move upwardly toward solenoid coil 48 when current is supplied to solenoid coil 48.

Figure 4:
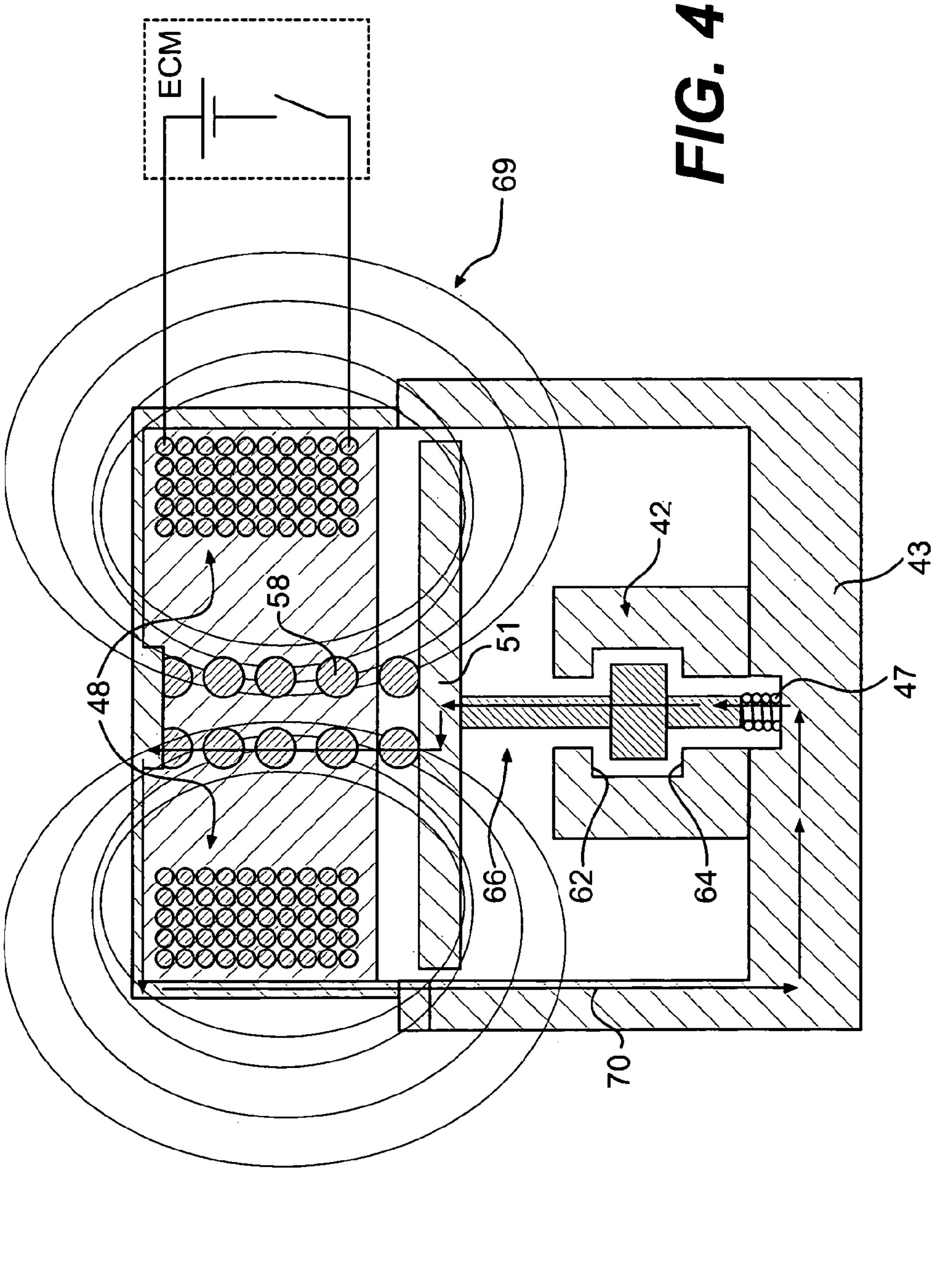
FIG. 4 is a diagrammatic illustration of current flow in an exemplary embodiment of a solenoid operated valve assembly.

Solenoid 40 may also include a plunger 52, a plunger sleeve 54, an upper armature washer 56, a lower armature washer 57, and a biasing spring 58, which may be operable to move armature 51 relative to solenoid housing 50. Biasing spring 58 may be configured to bias armature 51 and plunger 52 in a direction opposite to the direction these components are urged by solenoid coil 48. For example, as shown in FIGS. 2-4, armature 51 and plunger 52 may be configured to move in an upward direction, against the bias of biasing spring 58, under the influence of the magnet field produced by solenoid coil 48. Therefore, upon cessation of current to solenoid coil 48, armature 51 and plunger 52 may be moved in a downward direction under the bias of biasing spring 58.

Solenoid 40 may be connected to outer body 43 of fuel injector 24 (FIG. 2). Outer body 43 may be in electrical communication with an upper valve seat 62 and a lower valve seat 64 of valve 42. Plunger 52 may be connected directly to a valve member 66, which may be configured to selectively contact upper valve seat 62 and lower valve seat 64 to control the flow of fuel. Plunger 52 and valve member 66 may be secured to armature 51, as shown in FIG. 3, with plunger sleeve 54, armature washers 56 and 57, and a nut 68, which may be threaded onto the upper end of plunger 52.

When current is permitted to flow to solenoid coil 48, a magnetic field, illustrated by flux lines 69, may be generated around solenoid coil 48, as shown in FIG. 4. This magnetic field may, both at the time current is provided to solenoid coil 48 and at the time current flow to solenoid coil 48 ceases, induce voltage in biasing spring 58. This induced voltage may allow current (illustrated by arrows 70) to flow through interconnected electrically conductive components of solenoid operated valve assembly 38. At the same time, armature 51 may move under the influence of the magnetic field created by solenoid coil 48 or under the influence of biasing spring 58, and cause valve member 66 to make and/or break contact with upper valve seat 62 and/or lower valve seat 64. When current ceases to flow to solenoid coil 48, the magnetic field will collapse and biasing spring 58 will move armature 51 to thus move connected valve member 66 away from upper valve seat 62 toward lower valve seat 64. When current is permitted to flow to solenoid coil 48, valve member 66 may be moved away from lower valve seat 64 toward upper valve seat 62.

Absent preventative measures, an arc or spark discharge can occur between valve member 66 and upper valve seat 62 and/or lower valve seat 64. As valve member 66 arrives at or departs from the valve seat, such arcing can occur due to the current flow which is caused by the voltage induced in biasing spring 58 by the magnetic field. This arcing may result in pitting of valve members, such as, for example, upper valve seat 62 and/or lower valve seat 64.

One preventative measure may include a grounding device, which may include an electrically conductive element disposed between valve member 66 and outer body 43, to facilitate the transfer of current between outer body 43 and valve member 66. For example, as shown in FIGS. 2-4, the electrically conductive element may include grounding spring 47, which may prevent arcing in valve 42 by maintaining contact between outer body 43 and valve member 66 at all times. Such a configuration may allow current to flow from outer body 43 into valve member 66 through grounding spring 47, rather than by arcing across the gaps between valve member 66 and upper valve seat 62 and/or lower valve seat 64. Although a grounding device has been shown and described as a coil spring (grounding spring 47), various other kinds of grounding devices may be utilized to maintain an electrical connection between valve member 66 and outer body 43. For example, non-coil type springs may be used or, alternatively, any device configured to maintain such electrical contact between valve member 66 and outer body 43 may be employed.

Figure 5:
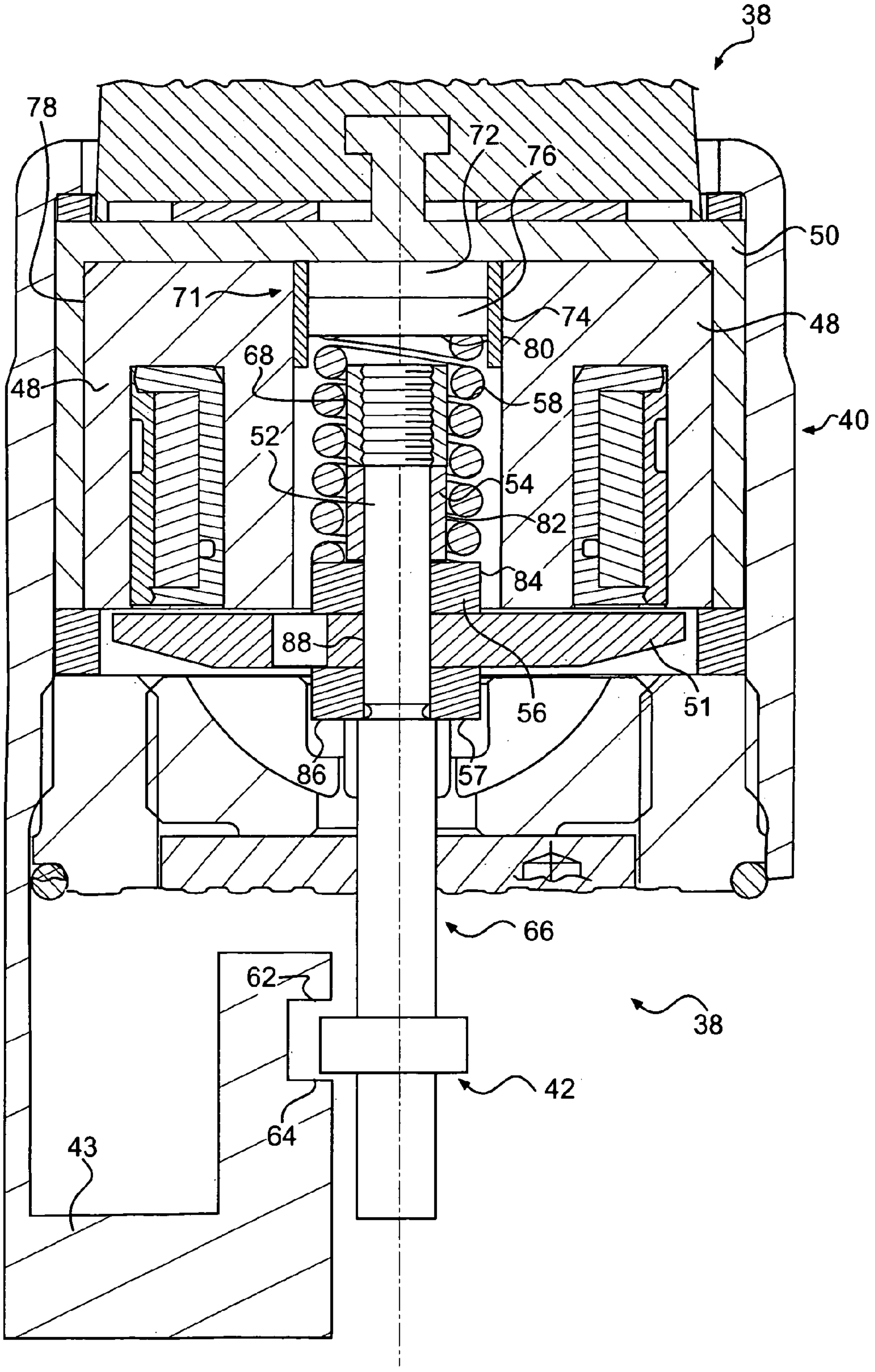
FIG. 5 is a diagrammatic illustration of another exemplary embodiment of a solenoid operated valve assembly.

In addition to, or as an alternative to, using a grounding device, other preventative measures may include the use of insulating elements in one or more locations within solenoid operated valve assembly 38. For example, in the embodiment shown in FIG. 5, one or more insulating elements may be provided for suppressing spark discharge between two or more components of solenoid operated valve assembly 38. FIG. 5 illustrates an embodiment wherein an insulating element interrupts the interconnection of electrically conductive components of the solenoid operated valve assembly 38 to prevent current flow to valve member 66, upper valve seat 62, and lower valve seat 64. In one exemplary embodiment, the insulating element may be a spacer 71 disposed between biasing spring 58 and housing 50. Spacer 71 may be a single piece or it may comprise plural pieces. In an exemplary embodiment, spacer 71 may include a disc 72 and a sleeve 74. Disc 72 and sleeve 74 may be separate elements. Alternatively, disc 72 and sleeve 74 may be integrally formed. One embodiment may include disc 72, but omit sleeve 74. Another embodiment may include sleeve 74, but omit disc 72. Disc 72 and sleeve 74 may be of various sizes. For example, disc 72 may extend further along the upper surface of housing 50 than shown in FIG. 5, and/or sleeve 74 may extend further along the length of biasing spring 58 than shown in FIG. 5. In addition, an electrically conductive shim 76 may be present between spacer 71 and biasing spring 58. In some embodiments, electrically conductive shim 76 may be omitted.

The insulating element may be made of any suitable material capable of substantially interrupting current flow between electrically conductive elements of solenoid operated valve assembly 38. For example, the insulating element may be made of a suitable polymer such as, for example, polyphenylene sulfide (PPS). The insulating element may also be made of any suitable ceramic, such as, for example, aluminum zirconium.

In another embodiment, the insulating element may be a coating of electrically insulating material on electrically conductive components of solenoid operated valve assembly 38. The coating may be any type of electrically insulating material such as, for example, a ceramic material. Any one of, or any combination of, the electrically conductive components of the solenoid operated valve assembly 38 may be provided with a coating of electrically insulating material. For example, a coating 78 may be provided for an inner surface of housing 50, a coating 80 may be provided for shim 76, a coating 82 may be provided for plunger sleeve 54, a coating 84 may be provide for upper armature washer 56, a coating 86 may be provided for lower armature washer 57, and/or a coating 88 may be provided for plunger 52 and the upper part of connected valve member 66.

In one embodiment, sleeve 74 may be a shrink tube of suitable polymer material provided, for example, to surround the outer diameter of the disc 72, shim 76, and at least a portion of biasing spring 58. Alternatively, sleeve 74 may be a plastic sleeve at least partially separating metallic components from solenoid coil 48.

Instead of, or in addition to, the insulating element, an element in the form of a magnetic flux reduction spacer may be provided to reduce magnetic flux fringing into biasing spring 58. This feature may be accomplished, for example, by forming upper armature washer 56 of stainless steel.

Figure 6:
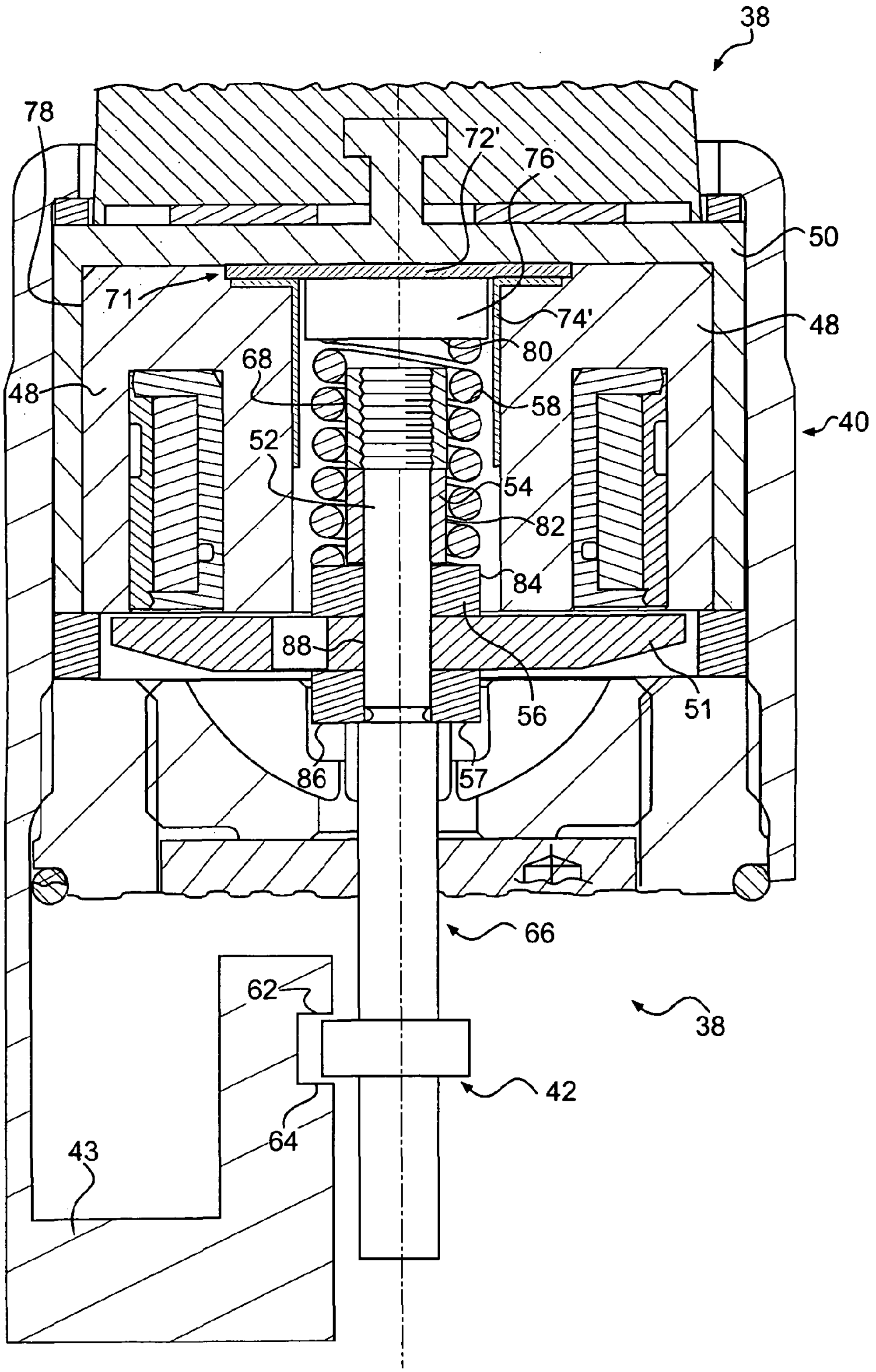
FIG. 6 is a diagrammatic illustration of yet another exemplary embodiment of a solenoid operated valve assembly.

FIG. 6 is a simplified diagrammatic and schematic illustration of yet another embodiment of solenoid operated valve assembly 38 including one or more insulating elements. In FIG. 6, spacer 71 may be in the form of a disc 72' made from any suitable electrically insulating material, such as polymers, ceramics, etc. One exemplary polymer that may be used for disc 72' is sold under the trademark MYLAR™. A sleeve 74' may be formed in a somewhat different configuration from sleeve 74 (FIG. 5) and, in some embodiments, may be metallic. As illustrated in FIG. 6, disc 72' may be disposed between housing 50 and metallic shim 76 and sleeve 74'.

Other means to avoid spark damage may include reducing the number of coils in biasing spring 58 or shorting the coils to each other to minimize or eliminate induced current. Spark damage may be adequately suppressed by using a Belleville spring stack for the biasing spring. Another way to avoid spark damage may be to increase resistance to any induced current by providing resistors in the current path. Yet another way to avoid spark damage may be to lower current to the solenoid coil 48 and thereby reduce unwanted induced current.

Figure 7:
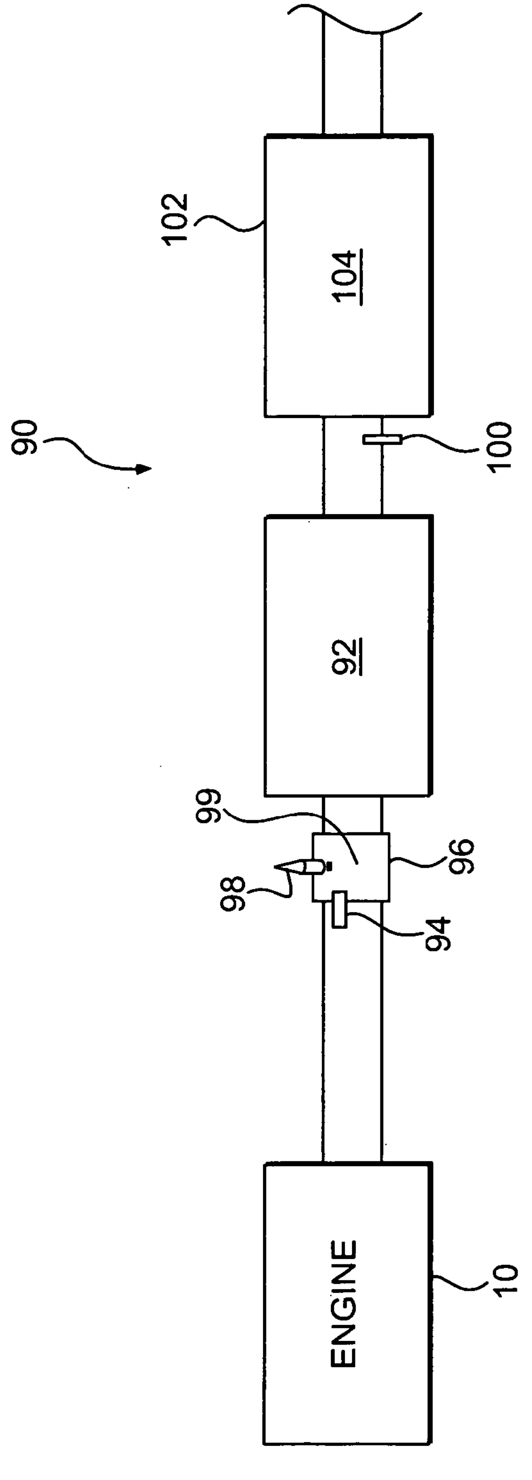
FIG. 7 is a diagrammatic illustration of an exemplary embodiment of an exhaust after-treatment system incorporating one or more solenoid operated valve assemblies.

FIG. 7 shows alternative embodiments wherein valve assembly 38 may be configured to regulate the flow of fluid to an after-treatment system 90. FIG. 7 illustrates an embodiment wherein after-treatment system 90 may be configured for active regeneration of a particulate trap 92. In such an embodiment, valve assembly 38 may be used in a fuel injector 94, which may be configured to regulate the flow of fuel to a burner 96. Burner 96 may include a spark generating device 98 (e.g., a spark plug or glow plug) configured to ignite fuel introduced to a combustion chamber 99 by fuel injector 94, thus creating a flame in order to heat particulate trap 92 for purposes of regeneration.

FIG. 7 also illustrates an embodiment wherein after-treatment system 90 may be configured for selective catalytic reduction (SCR). In such an embodiment, valve assembly 38 may be used in a fluid injector 100, which may be configured to regulate the flow of, for example, ammonia or urea, into the exhaust flow upstream from, or directly into, a catalytic converter 102. Fluid injector 100 may be configured to inject fluid into the exhaust stream to be carried in the exhaust flow and thus deposited in a catalyst 104 within catalytic converter 102 in order to facilitate selective catalytic reduction of various exhaust constituents, such as nitrous oxides ($NO_x$).

INDUSTRIAL APPLICABILITY

The disclosed embodiments may find applicability in any type of solenoid operated mechanism (e.g., valves, locks, actuators, etc.) where unwanted induced current may cause spark discharge or arcing between one or more components of the mechanism. For example, as disclosed herein, the disclosed concept may be applicable to solenoid operated valve assemblies, wherein unwanted spark discharge or arcing between components in associated valve members may cause damage to one or more components of the valve assembly. In one exemplary disclosed embodiment, a solenoid operated valve assembly may be a part of a fuel injection system.

Other exemplary applications of the disclosed valve assembly may include fluid injectors for exhaust after-treatment systems. For example, the disclosed valve assembly may be used in fuel injectors for a burner configured to heat a particulate trap for purposes of regeneration. The disclosed valve assembly may also be used in fluid injectors configured to deliver fluid, such as ammonia or urea, to a catalyst substrate, for purposes of selective catalytic reduction (e.g., of $NO_x$).

FIGS. 1-6 show exemplary manners in which the invention may be implemented in the context of a solenoid operated valve assembly of a fuel injector configured to inject fuel into a combustion chamber of an internal combustion engine. There may be alternative applications for which the embodiments of the valve assembly disclosed in FIGS. 1-6, or variations thereof, may be suitable, such as, for example, the fluid injection applications disclosed in FIG. 7.

Practical realities typically dictate that metallic or otherwise conductive components of a solenoid operated valve assembly 38 of a fuel injector 24 may be intimately connected to one another in the interest of space conservation and efficient packaging. In a solenoid operated valve assembly 38, it happens that actuation of solenoid 40 in a fuel injector 24 typically requires very rapid firing of the solenoid coil 48. For example, in a 2200 rpm, 4 shot system, there may be 73 shots/sec. This is equivalent to 262,800 shots/hr. Assuming that arcing is widely intermittent and only occurs just 1% of the time, this still equals 2,628 arcs/hr. In some embodiments, the area of face-to-face contact between surfaces in valve 42 of fuel injector 24 may be only 0.72 $mm^2$. Thus, it can be seen that a typical valve seat 62, 64 may be subjected to substantial arcing or spark discharge, which may result in pitting and/or wear.

A grounding spring has been illustrated in FIGS. 2-4, for providing a current path between outer body 43 and valve member 66. Due to the constant contact between outer body 43 and valve member 66, the tendency for arcing or spark discharge between these elements may be reduced or eliminated, thus reducing or preventing pitting and/or wear.

Insulating elements have been illustrated in FIGS. 3-6, for reducing or preventing the flow of current from biasing spring 58 to other surrounding elements, thus reducing or eliminating the amount of current in outer body 43. By reducing or eliminating current in outer body 43, the tendency for arcing or spark discharge at the interface between valve member 66 and valve seats 62 and 64 may be reduced or prevented. Insulating elements have been disclosed in the form of spacer 71, which may include disc 72 (or 72') and/or sleeve 74, as well as coatings 78, 80, 82, 84, 86, 88. It is to be understood, however, that limitation is not thereby placed on the particular shape of the insulating element or on the particular location for the insulating element other than that it be so placed as to effectively interrupt the circuit that leads to arcing between valve elements. For example, sufficient electrically insulating structure could be placed at any point in the circuit formed through biasing spring 58, housing 50, outer body 43, valve seats 62 and 64, valve member 66, plunger 52, armature 51, armature washers 56 and 57, plunger sleeve 54, nut 68, metallic sleeve 74' (FIG. 6), shim 76, or any other component present in a solenoid operated valve assembly capable of permitting current flow to a valve element.

The insulating element, or other insulating structure, may be formed of any of numerous insulating structures that otherwise possess characteristics suitable for use in the intended environment. For example, numerous polymers, ceramics, and composite materials used as electrical insulating materials may be used. The insulating element, or other insulating structure, can be secured in place in any of numerous ways, such as, for example, mechanical attachment by fasteners, adhesive bonding, or molding in place.

While disclosed herein as applicable to fuel injection solenoid valves, it is apparent that disclosed embodiments have applicability in other types of solenoid valves. The disclosed embodiments are contemplated to apply to any field of endeavor using solenoid valves, particular where the arrangement is such that arcing tends to occur between the valve components. For example, the disclosed embodiments may also be used in the area of pump control valves.

The method disclosed contemplates the provision of the various generic components of a solenoid operated valve assembly coupled with the grounding and/or interruption of the electrically conductive circuit otherwise formed by the various components of the solenoid operated valve assembly so as to prevent arcing between a valve member and a valve seat. This grounding may be accomplished by using a grounding spring between the valve member and the outer body. Interruption of the electrically conductive circuit may be accomplished by placing an electrically insulating element anywhere in the circuit to prevent current flow and resulting arcing between valve components.

The orientation of the solenoid and the valve are not critical to the implementation of the disclosed system. The orientation could obviously be different from that shown in the drawings. Moreover, the valve could be of the type that cooperates with a single seat or of the type that cooperates with plural seats (as shown in FIGS. 1-6), since arcing and pitting can occur in either type of valve.

Although embodiments of the invention have been described, it will be apparent to those skilled in the art that various modifications and variations can be made in the disclosed apparatus and method for avoiding spark damage in valve members without departing from the scope of the disclosure. In addition, other embodiments of the disclosed apparatus and method will be apparent to those skilled in the art from consideration of the specification. It is intended that the specification and examples be considered as exemplary only, with a true scope of the disclosure being indicated by the following claims and their equivalents.

What is claimed is:

1. A solenoid operated valve assembly, comprising:

a solenoid having a solenoid coil;

a valve member movable under influence of the solenoid coil from a first position to a second position, wherein the valve member selectively contacts a first valve seat when the valve member is in the first position and a second valve seat when the valve member is in the second position;

a biasing spring position on a first side of the valve member to bias the valve member towards the first position;

an outer body containing the solenoid, the valve member, the first valve seat, and the second valve seat;

a grounding device positioned on a second side of the valve member opposite the first side to electrically couple the valve member to the outer body; the grounding device being positioned such that a closed electrical path is formed through at least the outer bode, the biasing spring, the valve member, and the electrically conductive element when the valve member is between the first position and the second position; and an insulating element configured to reduce or prevent current flow between the biasing spring and the outer body.

2. The valve assembly of claim 1, wherein the insulating element is at least partially formed from at least one of a polymer and a ceramic.

3. The valve assembly of claim 1, wherein the insulating element includes a sleeve extending at least partially between the solenoid coil and the biasing spring.

4. The valve assembly of claim 1, wherein the solenoid includes a housing and a metallic shim disposed between the biasing spring and the housing, and the insulating element includes a spacer positioned at least partially between the metallic shim and the housing.

5. The valve assembly of claim 1, further including at least one of a housing, a metallic shim between the biasing spring and the housing, and an armature washer between the biasing spring and the armature, and wherein the insulating element includes a coating of insulating material on at least one of the housing, the metallic shim, and the armature washer.

6. A fluid injector configured to regulate the flow of fluid, comprising:

a solenoid operated valve assembly, including:

a solenoid having a solenoid coil;

an armature movable under influence of the solenoid coil;

a valve member configured to move with the armature from a first position to a second position, wherein the valve member selectively contacts a first valve seat when the valve member is in the first position and a second valve seat when the valve member is in the second position;

a biasing spring positioned on a first side of the valve member to bias the valve member towards the first position;

an outer body containing the solenoid, the armature, the valve member, the first valve seat, and the second valve seat; and a grounding device positioned on a second side of the valve member opposite the first side to electrically couple the valve member to the outer body, the grounding device being positioned such that a closed electrical path is formed through at least the outer body, the biasing spring, the valve member, and the grounding device when the valve member is between the first position and the second position; and an insulating element configured to reduce or prevent current flow between the biasing spring and the outer body.

7. The fluid injector of claim 6, wherein the insulating element includes a sleeve extending at least partially between the solenoid coil and the biasing spring.

8. The fluid injector of claim 6, wherein the solenoid includes a housing and a metallic shim disposed between the biasing spring and the housing, and the insulating element includes a spacer positioned at least partially between the metallic shim and the housing.

9. The fluid injector of claim 6, wherein the valve assembly further includes at least one of a housing, a metallic shim between the biasing spring and the housing, and an armature washer between the biasing spring and the armature, and wherein the insulating element includes a coating of insulating material on at least one of the housing, the metallic shim, and the armature washer.

* * * * *